US00RE39625E

(19) United States
(12) Reissued Patent
Shaw

(10) Patent Number: US RE39,625 E
(45) Date of Reissued Patent: May 15, 2007

(54) BOOSTED AIR SOURCE HEAT PUMP

(75) Inventor: David N. Shaw, East Falmouth, MA (US)

(73) Assignee: Hallowell International, LLC, Bangor, ME (US)

(21) Appl. No.: 10/641,999

(22) Filed: Aug. 15, 2003

Related U.S. Patent Documents

Reissue of:
(64) Patent No.: 6,276,148
Issued: Aug. 21, 2001
Appl. No.: 09/505,584
Filed: Feb. 16, 2000

(51) Int. Cl.
*F25B 13/00* (2006.01)

(52) U.S. Cl. ..... 62/117; 62/160; 62/196.1; 62/228.5; 237/2 B

(58) Field of Classification Search ..... 62/160, 62/117, 196.1, 228.2, 229, 510; 236/1 EA; 237/2 B
See application file for complete search history.

(56) References Cited

U.S. PATENT DOCUMENTS

| | | | | |
|---|---|---|---|---|
| 2,243,541 A | | 5/1941 | Swart | |
| 2,352,581 A | | 6/1944 | Winkler | |
| 2,646,212 A | | 7/1953 | Kellie | |
| 2,663,164 A | | 12/1953 | Kurtz | |
| 2,938,361 A | | 5/1960 | McNatt | 62/117 |
| 3,074,249 A | | 1/1963 | Henderson | 62/149 |
| 3,226,949 A | | 1/1966 | Gamache | 62/510 |
| 3,377,816 A | * | 4/1968 | Berger | 62/228.5 |
| 3,500,962 A | | 3/1970 | Kocher | 184/103 |
| 3,719,057 A | | 3/1973 | Grant | 62/193 |
| 3,775,995 A | | 12/1973 | Conley et al. | 62/196 |
| 3,785,169 A | | 1/1974 | Gylland, Jr. | 62/468 |

(Continued)

FOREIGN PATENT DOCUMENTS

| | | |
|---|---|---|
| EP | 0 106 414 | 4/1984 |
| EP | 0 715 077 A2 | 6/1996 |
| EP | 0 718 568 A2 | 6/1996 |
| JP | 06213170 | 2/1994 |
| WO | WO97/32168 | 9/1997 |

OTHER PUBLICATIONS

Theory of Mechanical Refrigeration, N.R. Sparks, McGraw Hill, 1938 (pp. (111–127).

J.L. Threlkeld, Thermal Environmental Engineering, Prentice–Hall, Inc. copyright, 1970, 1962 (pp. 63–69).

Survey And Comparison of Interstage Cooling Systems For Two Stage Compression, Data Sheet, No. 20, May 1979.

E.G. Pita, Refrigeration Principles and Systems, Business News Publishing Company, 1991 (pp. 243–245).

B.D. Wood, Applications of Thermodynamics, Waveland Press, Inc., copyright 1982 (pp. 218–222).

S.M. Elenka and Q.W. Minich, Standard Refrigeration and Air Conditioning Questions & Answers, McGraw Hill, copyright 1983,1973,1961 (pp. 28–31, 50–53).

I. Cerepnalkowski, Modern Refrigerating Machines, Elsevier Science Publishers, B.V., copyright 1991 (pp. 47,48).

A Technical Handbook From SWEP, 1993 (1 page plus cover and back sheets).

"New Technology and Products" Jul. 1999 (www.bristol-compressors.com).*

*Primary Examiner*—William E. Tapolcai
(74) *Attorney, Agent, or Firm*—Cantor Colburn LLP

(57) ABSTRACT

A boosted source heat pump (BSHP) is presented having a primary compressor, a booster compressor, an economizer, and a lubricant management system. At least the primary compressor is a twin-single compressor. The lubricant management system includes traps to prevent migration of lubricant to a non-operating compressor, and aspiration tubes from the sump to the low pressure intake zone to each compressor.

54 Claims, 9 Drawing Sheets

HEAT PUMP WITH BOOSTER COMPRESSOR
(HEATING FLOW PATH SHOWN)

U.S. PATENT DOCUMENTS

| | | | | | |
|---|---|---|---|---|---|
| 3,852,974 | A | * | 12/1974 | Brown | 62/510 |
| 3,859,815 | A | | 1/1975 | Kasahara | 62/197 |
| 4,197,719 | A | | 4/1980 | Shaw | 62/505 |
| 4,205,537 | A | | 6/1980 | Dubberley | 62/510 |
| 4,236,876 | A | | 12/1980 | Fraser et al. | 417/250 |
| 4,268,291 | A | | 5/1981 | Cann | 62/117 |
| 4,306,420 | A | | 12/1981 | Cann | 62/196 A |
| 4,332,144 | A | | 6/1982 | Shaw | 62/324.1 |
| 4,562,700 | A | | 1/1986 | Atsumi et al. | 62/174 |
| 4,594,858 | A | | 6/1986 | Shaw | 62/175 |
| 4,748,820 | A | | 6/1988 | Shaw | 62/175 |
| 4,753,083 | A | * | 6/1988 | Sato | 62/228.5 |
| 4,787,211 | A | | 11/1988 | Shaw | 62/117 |
| 4,833,893 | A | | 5/1989 | Morita | 62/197 |
| 4,947,655 | A | | 8/1990 | Shaw | 62/200 |
| 4,962,647 | A | | 10/1990 | Kuwahara | |
| 5,062,274 | A | | 11/1991 | Shaw | 62/117 |
| 5,094,085 | A | | 3/1992 | Irino | 62/175 |
| 5,095,712 | A | | 3/1992 | Narreau | 62/113 |
| 5,123,254 | A | * | 6/1992 | Inoue et al. | 62/160 |
| 5,191,776 | A | * | 3/1993 | Severance et al. | 62/510 |
| 5,220,806 | A | | 6/1993 | Jaster et al. | 62/179 |
| 5,236,311 | A | | 8/1993 | Lindstrom | 417/254 |
| 5,303,561 | A | * | 4/1994 | Bahel et al. | 62/160 |
| 5,410,889 | A | | 5/1995 | Sjoholm et al. | 62/160 |
| 5,626,027 | A | | 5/1997 | Dormer et al. | 62/175 |
| 5,657,637 | A | | 8/1997 | Mertens | 62/175 |
| 5,894,739 | A | * | 4/1999 | Temos | 62/510 |
| 5,927,088 | A | | 7/1999 | Shaw | 62/175 |
| 6,276,148 | B1 | | 8/2001 | Shaw | 62/117 |

* cited by examiner

HEAT PUMP WITH BOOSTER COMPRESSOR (HEATING FLOW PATH SHOWN)

HEAT PUMP WITH BOOSTER COMPRESSOR (COOLING FLOW PATH SHOWN)

(A) Both pistons operate when the compressor runs forward.

(B) Reverse the motor, and just one piston operates, as the crankshaft lobe repositions itself on the center axis of the shaft.

COMPRESSION MODULE FOR BOOSTED AIR SOURCE HEATING

LOW LEVEL HEATING DEPICTED

ONLY PRIMARY COMPRESSOR OPERATIONAL

LUBRICANT MANAGEMENT

COMPRESSION MODULE FOR BOOSTED AIR SOURCE HEATING

HIGH HEATING DEPICTED

BOTH COMPRESSORS OPERATIONAL

LUBRICANT MANAGEMENT

BOOSTED AIR SOURCE HEAT PUMP TYPICAL OPERATING SEQUENCE

THE CHART SHOWN BELOW SHOWS "TYPICALLY" *ALLOWED* CAPACITY STEPS FOR VARIOUS "TYPICAL" OUTDOOR AMBIENT TEMPERATURE RANGES.

| ALL ALLOWED STEPS | UP TO 15°F | ABOVE 15° TO 25°F | ABOVE 25° TO 33°F | ABOVE 33° TO 43°F | ABOVE 43° TO 50°F | ABOVE 50° TO 75°F |
|---|---|---|---|---|---|---|
| RESISTANCE | | NOT ALLOWED | NOT ALLOWED | NOT ALLOWED | NOT ALLOWED | NOT ALLOWED |
| COMB. 2-2-1 | | | NOT ALLOWED | NOT ALLOWED | NOT ALLOWED | NOT ALLOWED |
| COMB. 2-1-1 | | | | NOT ALLOWED | NOT ALLOWED | NOT ALLOWED |
| COMB. 2-1-0 | NOT ALLOWED | | | | NOT ALLOWED | NOT ALLOWED |
| COMB. 0-2-0 | NOT ALLOWED | NOT ALLOWED | | | | NOT ALLOWED |
| COMB. 0-1-0 | NOT ALLOWED | NOT ALLOWED | NOT ALLOWED | | | |
| OFF | | | | | | |

ONLY BLACKENED IN BOXES ARE ALLOWED FOR THE SHOWN TEMPERATURE RANGES.

0-1-0 MEANS 1 PRIMARY CYLINDER; 0-2-0 MEANS BOTH PRIMARY CYLINDERS; 2-1-0 MEANS 2 BOOSTER CYLS., 1 PRIMARY CYL. & NO ECONOMIZER; 2-1-1 ADDS THE ECONOMIZER; 2-2-1 ADDS THE SECOND PRIMARY CYLINDER.

FIG. 7

COOLING CONDITIONS

BOOSTED AIR SOURCE HEAT PUMP TYPICAL OPERATING SEQUENCE

THE CHART SHOWN BELOW SHOWS "TYPICALLY" *ALLOWED* CAPACITY STEP VARIOUS "TYPICAL" OUTDOOR AMBIENT TEMPERATURE RANGES.

| ALL ALLOWED STEPS | ABOVE 105° TO 125°F | ABOVE 85° TO 105°F | 60°F. TO 85°F |
|---|---|---|---|
| | (MANUAL) | | |
| COMB. 2-2-1 | | NOT ALLOWED | NOT ALLOWED |
| | | (MANUAL) | |
| COMB. 2-2-0 | | | NOT ALLOWED |
| | | | (MANUAL) |
| COMB. 0-2-0 | | | |
| | | | |
| COMB. 0-1-0 | NOT ALLOWED | | |
| | | | |
| OFF | | | |

ONLY BLACKENED IN BOXES ARE ALLOWED FOR THE SHOWN TEMPERATURE RANGES.

0-1-0 MEANS 1 PRIMARY CYLINDER; 0-2-0 MEANS BOTH PRIMARY CYLINDERS; 2-2-0 MEANS 2 BOOSTER CYLS., 2 PRIMARY CYL. & NO ECONOMIZER; 2-2-1 ADDS THE ECONOMIZER.

(MANUAL) MEANS THAT THE OPERATING STEP SHOWN MUST BE CALLED MANUALLY FOR THE SHOWN OPERATING TEMPERATURE RANGE.

FIG. 9

BOOSTED AIR SOURCE HEAT PUMP

Matter enclosed in heavy brackets [ ] appears in the original patent but forms no part of this reissue specification; matter printed in italics indicates the additions made by reissue.

BACKGROUND AND CROSS REFERENCE

This invention relates to air-source heat pumps. More particularly, it relates to new and improved air source heat pumps especially suitable for use in normally colder climates. This invention is an improvement on my U.S. Pat. No. 5,927,088, the entire contents of which are incorporated herein by reference.

The following discussion of typical prior art heat pumps refers to air-source heat pumps other than the heat pumps disclosed in my U.S. Pat. No. 5,927,088.

The air-source heat pump system is the most prevalent type of heat pump used in the world today. This is the case whether one is discussing room units, residential central type, ductless splits, or rooftop commercial systems.

Although the air-source concept in general has a high application potential worldwide, its popularity in the United States and elsewhere has been greatest in mild climate areas. This is because the compressor-derived heating capacity of typical prior art units declines rapidly as the outdoor ambient falls, due, in most part, to the large increase in specific volume (i.e., decrease in density) of the outdoor coil generated refrigerant vapor as the ambient (outdoor) temperature falls. This fall in compressor-derived heating capacity is obviously opposite to the heating requirement, which increases as the outdoor ambient temperature falls. When a typical prior art heat pump operates below its balance point (about 35° F.–40° F.), supplemental heating is required. The most prevalent form of supplemental heat used is electric resistance. In other than mild climates, this use of supplemental electric resistance heat puts the air-source heat pump at a serious economic disadvantage to a consumer as compared with other forms of heating (such as natural gas, oil, and propane), because of the high cost of electric resistance heating.

Electric utilities are also very concerned because of the associated large transformers and distribution systems that are required for any large populations of typical prior art heat pumps whenever high electric resistant (KW) heat backup is required on a regular basis for large population.

When operating at low outdoor ambient temperatures such as 0° F., homes heated by typical vapor art heat pumps require as much as KW input from the utility as does a home heated by electric resistance KW alone. This is not acceptable to the utility as they would have to increase their generating capacity to supply the demand. In other words, a Northern utility that was summer peaking would now become winter peaking because much more KW output is required for electrically heated Northern homes than what is required for cooling those same homes.

As discussed in my U.S. Pat. No. 5,927,088, one of the areas for capacity and efficiency improvement of air source heat pump systems lies in the recovery of significant heat energy currently remaining in the condensed liquid refrigerant leaving the system condenser. If this remaining energy is recovered and returned directly to the heating side of the system before being thermally degraded and sent to the system evaporator as low density vapor (as is now the case in present day systems), significant increases in compressor derived heating capacity and C.O.P. can be made at lower outdoor ambient temperatures.

The basic problem here is that after the refrigerant has been fully liquefied in the heating condenser, there is still a large amount of energy left in the leaving warm liquid. This remaining energy evaporates a large portion of the heating liquid itself during the normal pressure reduction process that is required to develop the necessarily low evaporating temperatures. Depending on the refrigerant utilized, and the degree of temperature existing between the evaporator and the condenser, as much as one-half of this liquid can be evaporated during this normal pressure reduction process across the system expansion device when operating at the lower outdoor ambient temperatures.

Obviously, if this liquid has already evaporated, it cannot be again evaporated in the system evaporator, and thus cannot absorb energy from the outside air. However, the net resulting vapor must pass through the system evaporator anyway, creating additional pressure drop along its way, and then must be induced and fully compressed to the condensing level by the compressor, thus requiring the necessary power to accomplish the compression. The C.O.P. of this portion of the heating process is only one (1) because no energy has been absorbed from the outside air.

Since the compressor must induct this previously evaporated vapor, the compressor can only induct a correspondingly smaller amount of vapor that has been derived from the cooling of outside air (by evaporating the refrigerant liquid that does enter the evaporator along with the previously mentioned vapor). This is not a reasonable process for typical prior art air-source heat pumps operating in other than the milder ambient temperatures because only under those conditions is the relative amount of liquid to vapor (by weight) sufficient to result in a good system C.O.P.

The heating energy output of any heat pump system is also closely proportional to the weight flow of refrigerant vapor entering the system condenser. Approximately 4 times the amount of heat energy is required of 0° F. than is required at 50° F. This means that approximately a 400% increase of entering condenser refrigerant vapor is required at 0° F. ambient as compared to 50° F. ambient in order to adequately match the heating energy requirement. However, the density of the refrigerant vapor generated in the system evaporator when operating at 0° F. ambient is only about 32% of that generated when the outdoor temperature is 50° F. Therefore, when approximately four (4) times the weight flow is required when only 32% of the vapor density is generated, it becomes very obvious that significant changes must be made in order to make an air source pump viable for colder Northern climates.

In addition, if the entire space heating requirement at 0° F. outdoor ambient is to be supplied by compressor derived heating capacity, the air flow across the heating coil of the condenser must be such that the indoor delivered air temperature will be around 105° F. in order to provide adequate freedom from a sensation of cool drafts. This in turn will cause the system condensing temperature to rise to around 115° F. considering a reasonably sized indoor coil surface.

The end result of all this (even if the necessary compressor displacement could be obtained somehow with a present day single compression stage system) is to cause overall system operating compression ratios to rise to the point where it becomes unrealistic to continue the use of typical prior art heat pump technology in normally colder climates. This is exactly what has happened in the marketplace of today. Air source heat pumps are no longer purchased for use in cold climate areas for reasons of both poor comfort as well as the very high cost of the electric energy requirement.

SUMMARY OF THE INVENTION

In this invention, a system and method are presented that achieve a great increase in refrigerant pumping capacity as related to large fall in the outdoor ambient temperature, combined with a method of extracting energy from warm liquid leaving the system condenser where this is needed as well. The heat pump system itself is made to be sufficiently flexing in order to accomplish the necessary goal of both sufficient and efficient heating for a wide range of outdoor ambient temperatures.

In order for anti-source heat pumps to become serious contenders for use in colder climates, significant changes must be made for them to realize their true potential. Fundamental Carnot Theory thermodynamic principles unquestionably show that electric powered air source heat pumps indeed to have significant potential in cold climates. In fact, the theoretical Carnot C.O.P. (coefficient of performance) limit for a sink (room) temperature of 70° F. and a source (outside air) temperature of 0° F. is 7.57 units of energy delivered to the sink for every 1 net unit of energy supplied to the compression process.

Carnot C.O.P.$=(T_2\Delta S)+(T_2-T_1)\Delta S$ where $T_2$ is the delivered energy sink temperature (room temperature in absolute degrees) and $T_1$ is the supplied energy source temperature (outside air temperature in absolute degrees) and $\Delta S$ is the constant change in entropy for this theoretical cycle. Therefore, executing the equation, the $\Delta S$'s cancel out and the final equation is simply Carnot C.O.P.$=T_2+(T_2-T_1)$ where only $T_2$ need be in absolute degrees.

It is expected that with this present invention, an actual heating C.O.P. of at least 2.0 will be reached at this 0° F. outdoor ambient condition. This represents a Carnot efficiency level of only $[(2.0+7.5)\times 100]=26\%$, which clearly is within the bound of rational achievability. Accordingly, the system and method of this invention allows the basic electric utility service size to be only about 50% of that which is required for today's heat pumps selected for cold climates.

In typical prior art systems, the actual delivered C.O.P. is only about 1.0 at the condition of 70° F. room temperature and 0° F. outside air temperature, because most of their delivered energy comes from electric resistance coils which obviously operate with a C.O.P. of 1.0 (1 unit of delivered energy for every 1 unit of supplied energy). Also, with these typical prior art systems, the delivered energy that does come from the refrigeration circuit may even come with a C.O.P. of less than 1 at these low outdoor ambient temperatures because of a significant percentage energy loss between the outdoor unit and the indoor condenser when operating under low refrigerant flow rate condition. Further to this problem, most residential type compressors also operate rather inefficiency at this 0° F. condition. Some system manufacturers even shut down their compressors at temperatures of 0° F. and rely entirely on electric resistance for a variety of different reasons as well.

Typical Embodiment of a New System

An embodiment of the present invention is directed to a refrigeration circuit which comprises one first stage booster compressor, one second stage primary compressor (always the first to run), a condenser, an economizer, an evaporator, and conduit means bearing a compressible refrigerant working fluid and connecting the first stage compressor, the second stage compressor, the condenser, the economizer, and the evaporator, in series and in that order, in a closed loop. An important feature of the present invention is a novel apparatus and method for oil equalization between the primary and booster compressors.

The closed loop further comprises a bleed line for bleeding a portion of the condensed refrigerant from the closed loop downstream of the heating condenser and expanding it within the economizer for highly subcooling the liquid refrigerant within the closed loop being fed to the evaporator. The expanded refrigerant from the economizer is then delivered to a point between the outlet of the first stage compressor and the inlet to the second stage compressor. The subcooling of the liquid refrigerant in the economizer greatly increases the ability of the refrigerant to absorb heat energy in the evaporator. Also, the vapor created by this subcooling process significantly increases the refrigerant weight flow into the heating condenser as it is directly added to the flow coming form the first stage compressor.

In accordance with this invention, at least the primary compressor is a multi-cylinder unloadable compressor, such as a Bristol Twin-Single, or similar type compressor (TS), preferably a 40/100 TS or a 50/100 TS compressor. A Bristol twin-single compressor has two cylinders and pistons. In one direction of rotation of the drive shaft, both cylinders/piston are operating (full capacity operation). In the reverse direction of rotation of the drive shaft, only one piston/cylinder is operative, and the other piston/cylinder is idle (partial capacity operation). A TS compressor is a preferred type of unloadable positive displacement compressor for use in this invention. In a preferred embodiment, the booster compressor is a one-speed compressor (although a two speed or variable speed compressor could also be used). In another embodiment, both the primary compressor and the booster compressor are Bristol BS compressors.

While the invention will be described as using the Bristol twin-single compressor, it will be understood that other steps of unloadable positive displacement compressors or other unloadable multi-cylinder positive displacement compressors could be used. For example, using the designation of 2/1 for a Bristol twin-single compressor, a 4/2 multi-cylinder compressor (i.e., four cylinders for fully capacity/two cylinders for partial capacity) or a 6/3 multi-cylinder compressor (six cylinders for full capacity/three cylinders for partial capacity), etc. could be used.

An important point related to maximum system pumping capacity is that the first stage (booster) compressor has a larger displacement (by about 10% to about 50%) than the second stage (primar) compressor.

The discharge pressure of the booster will rise to the point where the density (pounds per cubic foot) of the vapor entering the primary compressor times the primary compressor pumping capacity (in cubic feet per minute) exactly equals the pounds per minute of vapor existing the booster compressor plus the pounds per minute of vapor exiting the economizer. The increased displacement of the booster (compared to the primary) along with a very high volumetric efficiency of (because of the low booster discharge pressure) results in a very high booster flow rate. This very high refrigerant flow rate multiplied by the increased energy pickup per pound of refrigerant flowing through the evaporator (because of the low liquid refrigerant temperature entering the evaporator due to the economizer), results in a very large increase in the total amount of energy per minute absorbed from the outside air into the operating system. This increase also comes about when it is most needed, i.e., at the lower outdoor ambient air temperatures.

A typical control system for the present invention includes a transducer for directly sensing the outdoor ambient temperature, preventing excess system capacity (through utilization of a micro-processor) until the outdoor temperature reaches a predetermined low enough value to allow or enable more system capacity, if called for by the indoor thermoset. The control system (on heating) also responds to a preferred, three step indoor thermoset which will step the system heating capacity to various levels (upon indoor temperature demand) that, in turn, are allowed or enabled by the various outdoor ambient temperature ranges that are encountered. The control system, on cooling, also responds to the same indoor thermoset, which has two cooling steps, which will step the system cooling capacity to various levels (upon indoor temperature demand) that, in turn, are allowed or enabled by the various outdoor ambient temperature ranges that are encountered.

The preferred displacement ratio of the booster to the primary (at 100% primary compressor flow) is only about 1.3 to 1. This keeps the pressure ratio across the booster relatively low (whenever it needs to be low), thus resulting in higher booster volumetric efficiencies. This displacement ratio thus keeps the economizer boiling temperature low (again, whenever needed), thus allowing the extraction of as much energy as possible from the warm liquid leaving the system condenser. These facts combined with the utilization of Refrigerant R-410A keep the total displacement required very low considering the heating capacity level that is obtained during low ambient heating. It also allows utilization of relatively low cost smaller reciprocating or other type compressors.

The above-discussed and other features and advantages of the present invention will be appreciated and understood by those skilled in the art from the following detailed description and drawings.

BRIEF DESCRIPTION OF THE DRAWINGS

FIG. 7 is a chart showing a typical operating sequence in the heating mode for a system of the present invention.

FIG. 9 is a chart showing a typical operating sequence in the cooling mode for a system of the present invention.

DESCRIPTION OF THE PREFERRED EMBODIMENT

Figure 1:
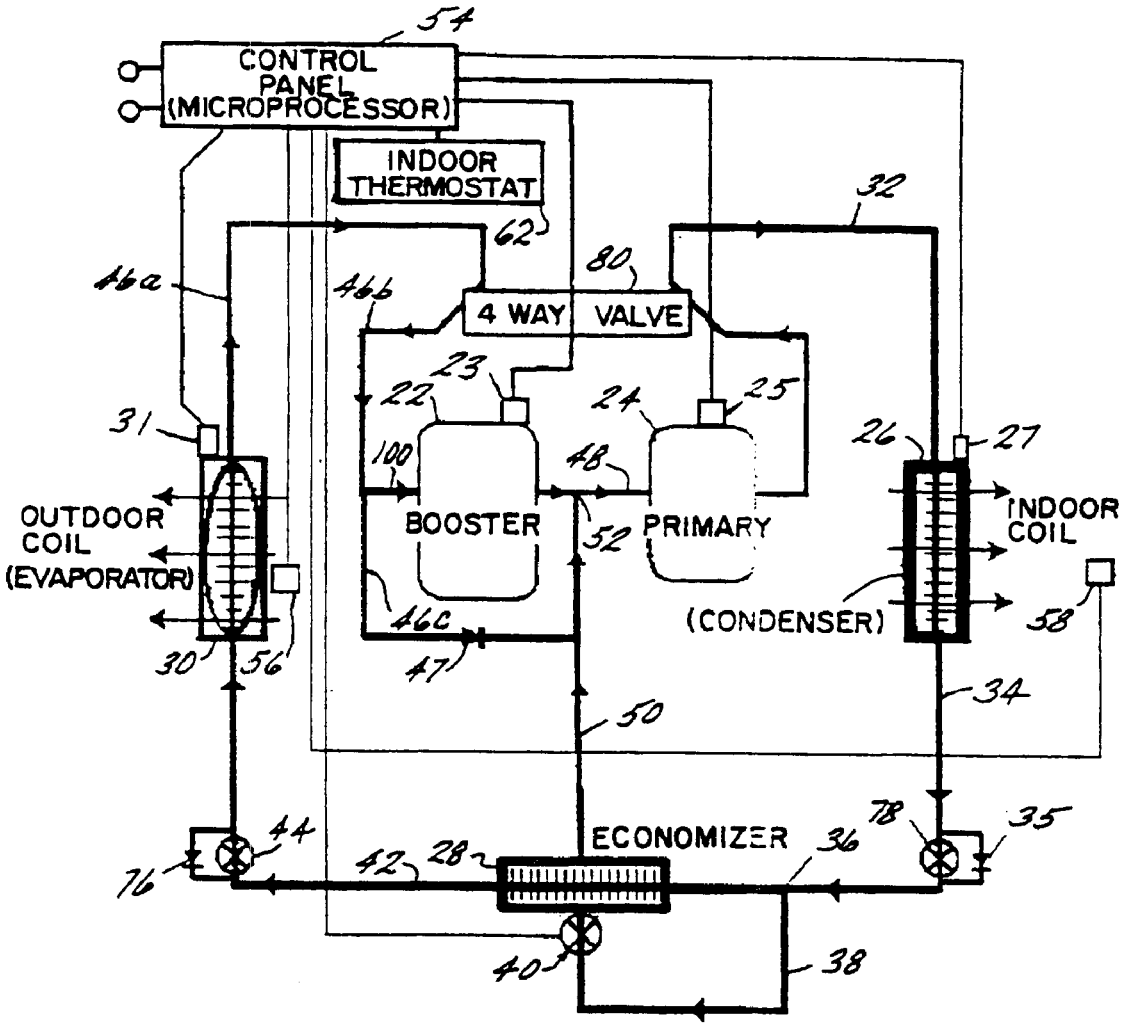
FIG. 1 is a schematic diagram of a heating mode operation of a closed loop boosted air source heating pump of the present invention.
Figure 2:
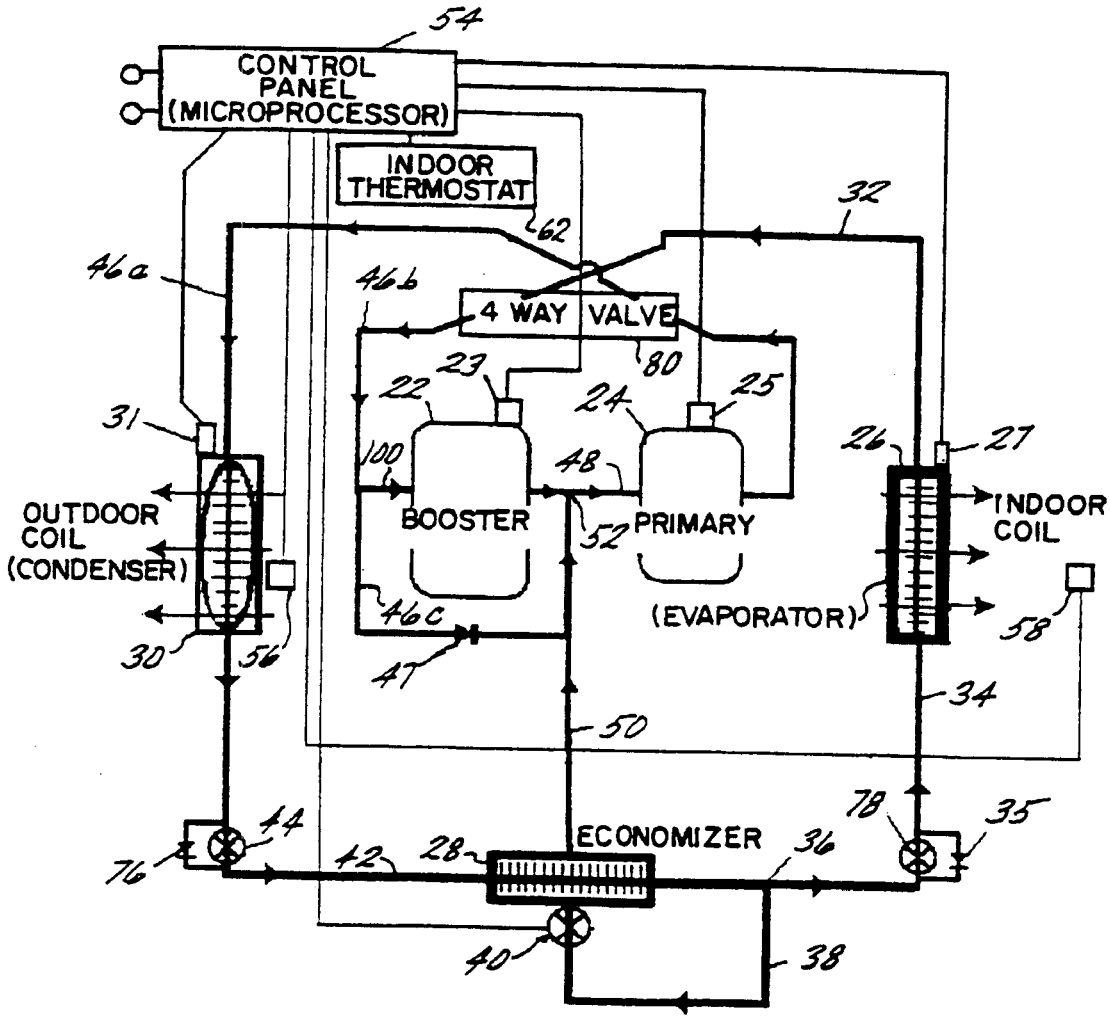
FIG. 2 is a schematic diagram of a cooling mode operation of a closed loop boosted air source heat pump of the present invention.

Referring to FIGS. 1 and 2, there is shown a closed loop heat pump system forming an embodiment of the present invention. Referring first to FIG. 1, the closed loop system includes a first or booster stage compressor 22, a second or high stage primarily compressor 24, an indoor coil or condenser 26 which delivers heated air to a space to be heated, an economizer 28, and an outdoor coil or evaporator 30 which, together with conduit means interconnecting these elements in a closed loop circuit, are basic components of the closed loop heat pump system. High stage or primary compressor 24 is normally operating whenever the heat pump system is delivering energy, but booster compressor 22 and economizer 28 are operated only when operation is allowed by the control system depending on outdoor ambient temperature. Warm output vapor of the primary compressor 24 is fed to the inlet of indoor coil 26 via 4 way valve 80 and conduit segment 32, thus heating air flowing over indoor coil 26 for delivery to the indoor space to be heated. A variable speed fan 27 normally controls the flow of air over indoor coil 20. The warm refrigerant vapor is, of course, cooled and condensed in indoor coil 26. The outlet of indoor coil 26 delivers the condensed refrigerant to flow via conduit segment 34 and check valve 35 to the economizer 28. A bypass or bleed line 38 may permit a portion of the liquid refrigerant to be bled from the primary closed loop circuit and to expand via an expansion valve 40 within economizer 28. However, expansion valve 40 is normally closed, and it is opened upon receipt of an operating signal from a microprocessor 54 to allow operation of economizer 28. With expansion valve 40 in its normally closed position, the refrigerant passes directly through economizer 28, but without any economizer action or effect, to conduit segment 42, and then through expansion valve 76 to outdoor coil or evaporator 30. A fixed or variable speed fan 31 delivers the air flow over outdoor coil 30. The refrigerant then flows from evaporator 30 through conduit segment 46a, and through four-way valve 80 to conduit segments 46b and 46c, and then to the inlet to primary compressor 24.

When operation of the booster compressor 22 is allowed by microprocessor 54, the refrigerant flows from conduit section 46b to the inlet to booster compressor 22, and then via conduit 48 from the discharge from booster 22 to the inlet to primary compressor 24.

Each of components 22 and 24 has its own internal motor, indicated at 23 and 25, respectively. Each motor is connected to microprocessor 54, and the operation of each compressor is allowed only by the presence of an activating signal from microprocessor 54 to the compressor motor to operate the compressor.

The system also includes a temperature transducer 56, such as a thermistor, at outdoor cell 30 to sense the temperature of the outdoor air flowing over outdoor coil 30, a temperature transducer 58, such as thermistor, at indoor coil 26 to sense the temperature of air leaving indoor coil 26, and an indoor thermostat 62 which senses the temperature of the air in the space to be heated and sends signals to microprocessor 54 when heat is required or when the desired temperature has been attained. Transducers 56 and 58 and thermostat 62 are connected to deliver signals to microprocessor 54. The signals received at microprocessors 54 from outdoor ambient temperature transducer 54 are used to allow various combinations of operation of the primarily compressor 24, booster compressor 22 and economizer 28 as a function of outdoor ambient temperature to meet heating requirements; and the signals received at microprocessor 54 from transducer 58 are used to reduce the speed of fan 27 to reduce or eliminate the "cold blow" problem common to heat pump systems (by reducing air flow at higher ambient temperatures).

In the present invention, thermostat 62 has three operating points or stage for heat operation and two operating points or stages for cooling operation. A thermostat of this type may, be e.g., a Minneapolis Honeywell thermostat type T8611M2005 or T8511M1002, available from Minneapolis Honeywell.

Figure 3A:
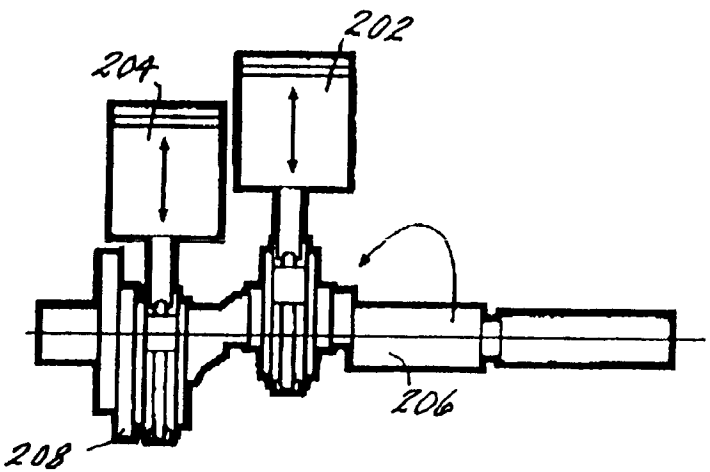
FIG. 3 is a schematic showing of the shaft, lobe and pistons of a Bristol Twin-Single compressor.
Figure 3B:
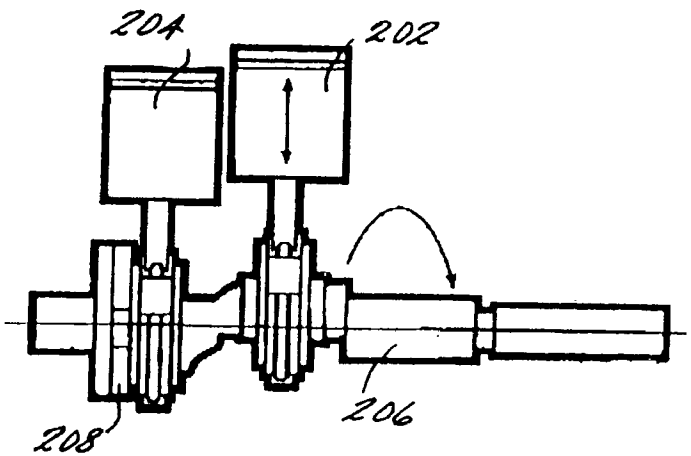

In the embodiment now being discussed of the present invention, both primary compressor 24 and booster compressor 22 are Twin-Single compressors available from Bristol Compressors of Bristol, Va. Referring to FIG. 3, the Bristol Twin-Single is a compressor reciprocating compressor having two pistons 202 and 204, mounted on a shaft 206. Shaft 206 can be rotated either clockwise or counterclockwise. Rotatable eccentric lobe 208 is also mounted on shaft 206. When shaft 206 is rotating, one of the pistons, e.g., piston 202, is always reciprocating, regardless of the direction of rotation of shaft 106. When shaft 206 is rotating in the direction shown in FIG. 3A, lobe 208 is positioned off center of the axis of shaft 206 so that piston 204 also reciprocates (along with piston 202). However, when shaft 206 is rotated in the opposite direction, as indicated in FIG. 3B, lobe 208 is repositioned on the center axis of shaft 206, whereby piston 204 is idle, i.e., does not reciprocate, and only piston 202 reciprocates.

It will be understood that the cylinders in which the pistons 202 and 204 reciprocate are not shown.

The fluid flow capacity of a Bristol TS compressor can be split, i.e., allocated, as desired between the two pistons/cylinders. For example, the capacity can be split between 40%/100% to 50%/100% or somewhat larger ratios, where 100% is the flow capacity when both cylinders are reciprocating, and where the lower number is the percentage of total flow capacity when only one piston is reciprocating. For the present invention, a 50/100 split or a 40/100 split is preferred. A split of 40/100 provides adequate heating capacity at higher ambient temperatures where operation of only one cylinder of the primary compressor is required.

In a second embodiment of the present invention, only primary compressor 24 is a Bristol TS of similar type compressor. In this second embodiment, booster compressor 22 is either a two speed compressor, or a single speed (fixed displacement) compressor, the latter resulting in the lowest manufacturing cost for the system. In this case, the booster compressor can be any type of positive displacement compressor.

Also, is preferred that the compressors be sized so that (1) 100% of the capacity of primary compressor 24 be equal to the rated capacity normally required for cooling by Air Conditioning and Refrigerant Institute (ARI) standards, and (2) the displacement ratio of booster compressor 22 to primary compressor 24 be in the range of 1.1:1–1.7:1, preferably about 1.3:1.

Operating sequences for heating and cooling will be set forth and discussed below. At various points in the operating sequences, valve 40 will be operated by a signal from microprocessor 54 to bleed and expand refrigerant fluid from point 36 in line 34 to economizer 28. The expansion of the refrigerant in economizer 28 results in significant subcooling of the main body of liquid refrigerant which flows in a closed conduit through economizer 28. This subcooled liquid refrigerant then passes directly to evaporator 30 via conduit segment 42. This highly subcooled liquid refrigerant expands via expansion valve 44 into and within the evaporator 30 to perform the function of absorbing energy from the outside air flowing over outdoor coil 30 and vaporizing in evaporator 30. The amount of energy absorbed within evaporator 30 is greatly increased because of the highly subcooled refrigerant delivered from economizer 28 to the evaporator. The refrigerant vapor from evaporator 30 then flows via conduit segment 46a, 46b and 46c and check valve 47 to point 52 and via conduit segment 48 to the suction or low side of primary compressor 24 to complete the closed loop circulation in effect when only the primary compressor 24 is operating, or to the suction or low side of booster compressor 22 if both compressors are operating.

Meanwhile, the refrigerant bled via line 38 which vaporizes within the economizer to perform the cooling effect in the economizer, passes via conduit segment 50 to point 52 in conduit 48 connected to the inlet of the primary compressor 24.

The heating mode of operating of the heat pump system is shown in FIG. 1, and the cooling mode of operation is shown in FIG. 2. In the heat mode operation of FIG. 1, the refrigerant flows through the closed loop conduit in the direction shown by the arrows in the conduit. To change from the heating mode of FIG. 1 to the cooling mode of FIG. 2, four way valve 80 is operated, as by a mode selection signal from thermoset 62 or microprocessor 54, whereby the direction of refrigerant flow in the closed loop conduit is reversed, as indicated by the arrows in FIG. 2. In the cooling mode, indoor coil 26 functions as an evaporator, and outdoor coil 30 functions as a condenser.

Lubricant, e.g., oil, management is an important aspect of the present invention. With two compressors connected to series, a potential exists for most or all of the lubricant in the system to accumulate in the sump of one of the compressors, and for the other compressor to become starved for lubricant. That, of course, can lead to failure of the lubricant-starved compressor. The present invention addresses and solves this problem.

Figure 4:
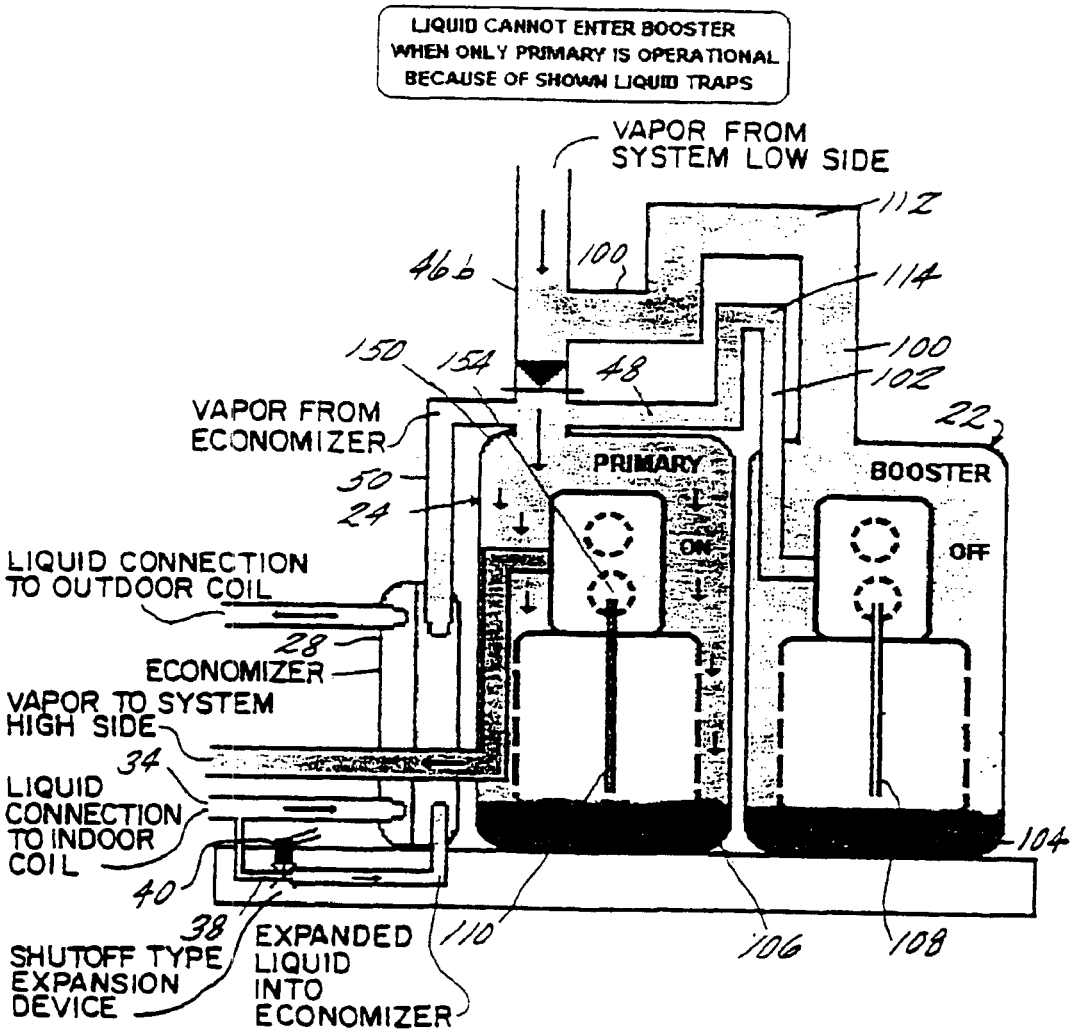
FIG. 4 is a schematic diagram of lubricant management in accordance with the present invention when only the primary compressor is operational.
Figure 5:
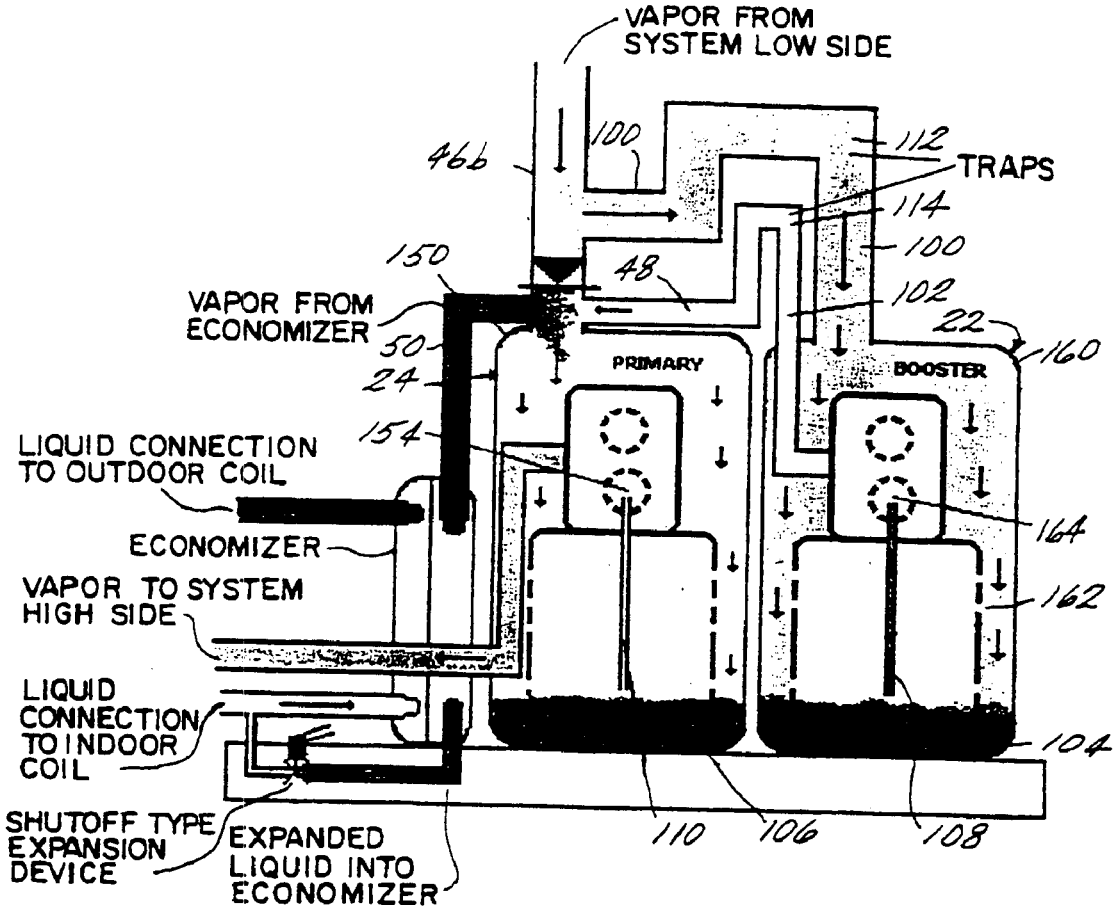
FIG. 5 is a schematic diagram of lubricant management in accordance with the present invention when both the primary and booster compressors are operational.

Reference is made to FIG. 4 and 5, which are side schematic views of a compressor module housing the booster and primary compressors 22, 24. Parts in FIGS. 4 and 5 are numbered as in FIG. 1.

As shown in FIG. 4, only the primary compressor is operational. Each of compressors 22 and 24 has a reservoir of oil, respectively 104 and 106 in the sump of each compressor. The compressors also have aspiration tubes 108, 110, respectively, from the sump to the cylinder intake. The tubes 108, 110 operate to prevent accumulation of lubricant above the lower level of the tubes when each compressor is operating. When the lubricant level rises above the lower level of a tube, the tube sucks lubricant from the sump into the cylinder intake when a compressor is operating. The lubricant is then entrained as liquid droplets in the circulating refrigerant for circulation through the system, and the lubricant droplets then return and drop into the compressor sump when the refrigerant enters the compressor intake.

The refrigerant and entrained lubricant, as indicated by the arrows, flows into the inlet to the interior of compressor shell or can 150. The lubricant droplets fall into sump 106, and the refrigerant gas flows through the holes 150 of the compressor motor to cool the motor, and the refrigerant gas then pass flows to the intake manifold to the cylinders 154 of primary compressor 24. The lubricant in the sump 106 is at the pressure of the refrigerant entering can 150, which is slightly higher than the pressure of the refrigerant entering the intake 154 to the cylinders. Aspiration tube 110 extends from the lubricant sump to the point of lowest pressure in the intake to the cylinders of the primary compressor.

In the system as shown in FIG. 4, since booster 22 is not operating, it is important to prevent the lubricant from entering into and accumulating in the sump of the booster. If the lubricant were permitted to enter into booster 22, the lubricant would merely accumulate in the sump of booster 22, since compressor 22 is inoperative and, therefore, no aspiration occurs through tube 108. This would eventually result in adequate lubrication for primary compressor 24.

Entry of the lubricant into the booster 22 when the booster is inoperative is prevented by a pair of traps 112 and 114. Trap 112 in conduit section 100 prevents entry of lubricant from conduit segment 46b, and trap 114 in conduit section 48 prevents entry of lubricant from conduit segment 48. Accordingly, all circulating lubricant is directed to the operating primary compressor 24.

If the level of lubricant 106 in the sump of primary compressor 24 rises above the bottom of siphon tube 110, the excess accumulation will be aspirated into the intake of the primary compressor and then circulates with the refrigerant vapor leaving the compressor.

Referring to FIG. 5, which shows both compressors operational, the refrigerant and entrained oil flow via conduit 100 to the inlet to booster can or shell 110. The lubricant droplets fall into the lubricant sump 104, and the refrigerant gas flows through the holes 162 of the compressor motor to cool the motor, and the refrigerant gas then flows to the intake manifold to the cylinders 164 of booster compressor 22. The lubricant in sump 104 is at the pressure of the refrigerant entering can 160, which is slightly higher than the pressure of the refrigerant entering the intake 164 to the cylinders. Aspiration tube 108 extends from the lubricant sump to the point of lowest pressure in the intake to the cylinders of the booster compressor.

When both compressors 22 and 24 are operating (see FIG. 5), the circulating refrigerants and any entrained lubricant, are drawn from conduit segment 46b through trap 112 and conduit segment 100 into the shell of booster 22. The refrigerant discharge from compressor 22 then flows through conduit segment 48 and trap 114 to the intake manifold of compressor 24. If the level of lubricant 104 in the sump of compressor 22 rises above the bottom of tube 108, the excess lubricant is aspirated into the cylinder of compressor 22 and then entrained in the refrigerant fluid delivered through conduit 48 and trap 114 to the intake to compressor 24. Similarly, if the level of sump lubricant 106 rises above the bottom of the tube 110, the lubricant is aspirated into the cylinder of compressor 24 and is then circulated as before. In this way, the sump lubricant levels in both compressors are maintained at desired levels, and both compressors are lubricated.

While the lubricant management has been described for a pair of compressors connected in series, the same system of traps and siphon tubes can be used with compressors connected in parallel. The tubes maintain desired levels of lubricant when in each operating compressor, and the traps prevent delivery and build-up of lubricant in compressor 22 when it is not operating.

EXAMPLE 1

Figure 6:
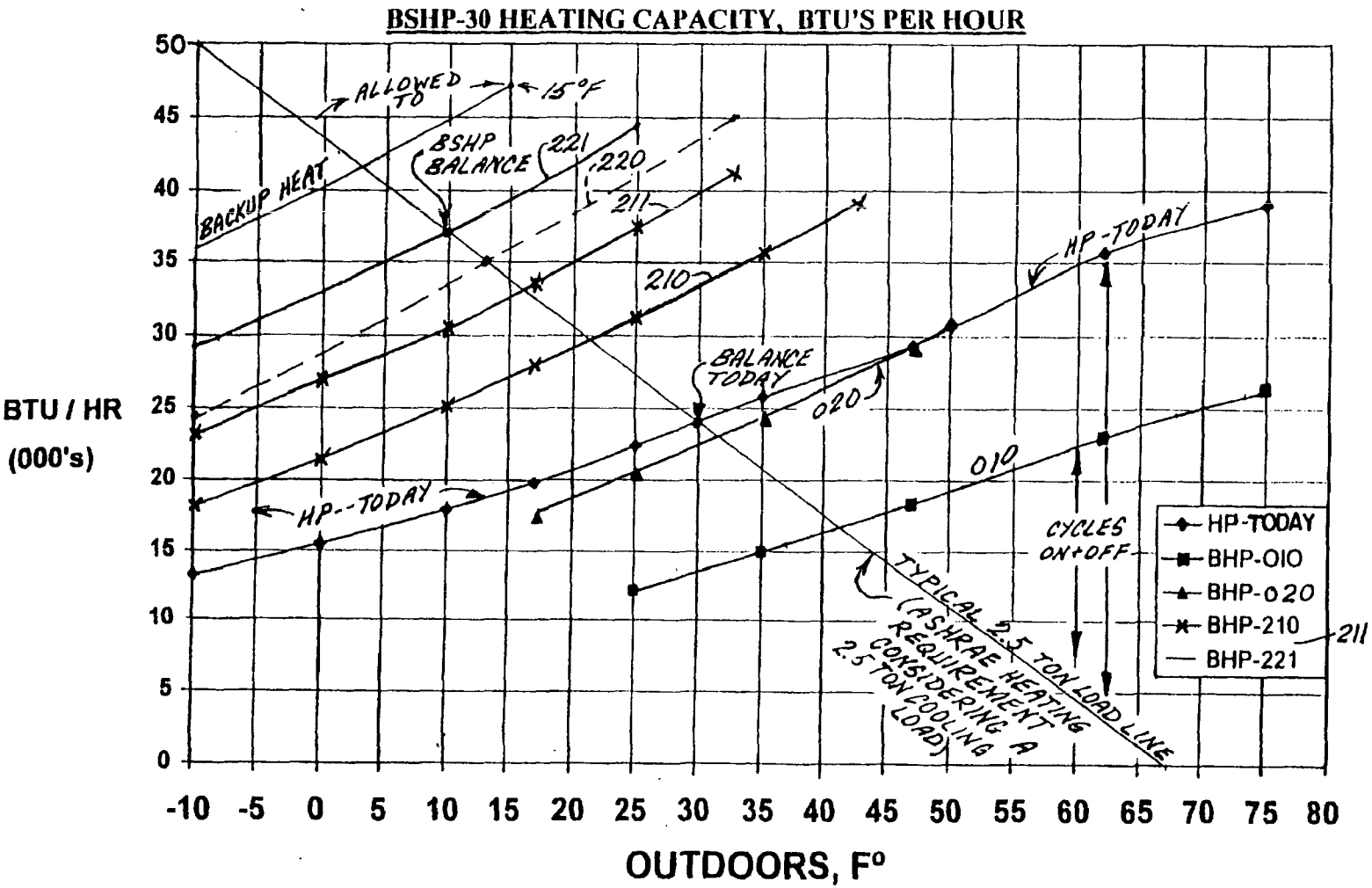
FIG. 6 is a heating capacity chart for a typical system of the present invention.

Referring now to FIGS. 6 and 7, a heating capacity chart and an exemplary operating sequence are shown. It will be recalled that thermostat 62 preferably has three stages in the heat mode. The thermostat stages signal microprocessor 54, which, in turn, sends signals to allow (i.e., control) the operation of the compressors, and/or one or both cylinders of the compressors, and/or the economizer.

Typically, the heating cycle starts when the first stage or step of indoor thermostat 62 calls for heat. When this occurs somewhere between 75° F. and above 50° F. outdoor ambient temperature, as sensed by sensor 56, one piston of primary compressor 24 is allowed to operate, i.e., is activated by a signal from microprocessor 54. Depending on the configuration, this provides 40% or 50% of the displacement of primary compressor 24. This mode of operation is identified in FIGS. 6 and 7 as 010, signifying 0 cylinder operation of the booster, 1 cylinder operation of the primary and no operation of the economizer.

When the ambient temperature drops to about 50° F., operation of the second piston of primary compressor 24 is allowed by microprocessor 54, but only if called for by the second stage of thermostat 62. This mode of operation is indicated by the 020 lines on FIGS. 6 and 7.

No additional heating capacity can be brought on line until the outdoor ambient further drops to about 43° F. or so, even if the third step of the indoor thermostat calls for more heat. This is designed to prevent the system from supplying more capacity than is really needed, as, if it were to be supplied, it would come about at a low efficiency level because the condenser would operate at an unnecessarily high pressure and the evaporator would operate at an unnecessary low pressure.

When the outdoor ambient temperature reaches about 43° F., microprocessor 54 allows operation of both cylinders of booster compressor 22 (100% booster operation), but with operation of only one cylinder (40% or 50% displacement) of the primary compressor, and without operation of the economizer. This mode is indicated at the 210 lines in FIGS. 6 and 7. This mode becomes the maximum capacity heat capacity allowed until the outdoor ambient temperature drops to about 33° F. Then, microprocessor 54 also allows operation of the economizer 28 by sending a signal to open valve 40, but this signal is sent only if the third stage or step of indoor thermostat 62 calls for more heat. This mode of operation is indicated at the 211 line in FIGS. 6 and 7.

When outdoor ambient temperature reaches about 25° F. a signal from microprocessor 54 allows operation of both cylinders of primarily compressors 24, along with both booster cylinders and the economizer. This mode of operation is indicated at the 221 lines in FIGS. 6 and 7. This is the maximum capacity heat pump mode, and it continues in operation until the outdoor ambient temperature reaches about 15° F.

At the 15° F. outdoor ambient temperature level, and if the third step of the indoor thermostat is calling for more heat, microprocessor 54 sends a signal to allow operation of back-up electric resistance heating.

As seen from FIG. 6, the BSHP (boosted source heat pump) of this invention meets the heating requirement without the need for back-up resistance heating all the way down to an outdoor ambient temperature of about 10° F. This is far superior to a typical prior art heat pump, the capacity line of which is labeled "HP-TODAY" in FIG. 6, where back-up resistance heat is required at about 30° F. outdoor ambient temperature. Bearing in mind that the high cost of resistance back-up heat is one of the main disadvantages of typical prior art heat pumps, the significant advantages of the present invention are apparent.

EXAMPLE 2

While incorporation of economizer 28 in the system is preferred, the economizer can be omitted. In that case, the displacement ratio of the booster compressor 22 to primary compressor 24 would be increased sufficiently to realize a system capacity about that of the system with the economizer, understanding that a system efficiency loss would occur due to the absence of the economizer. In this case, at conditions of 0° F. outdoor ambient and 70° F. indoor heated space temperature, the heating coefficient of performance (C.O.P.) will be at least 1.5 and may approach 2. By way of example, the displacement ratio of booster compressor 22 to primary compressor 24 could be increased to about 1.4:1 to about 1.7:1. Referring to FIGS. 6 and 7, with the economizer eliminated, the 211 line would be eliminated, and the 211 line is replaced by a 220 line, with the allowance point being the outdoor ambient temperature at which the 221 line was previously allowed, i.e., between about 15° F.–25° F. in Example 1. The 220 line is shown as a dashed line in FIG. 6.

Figure 8:
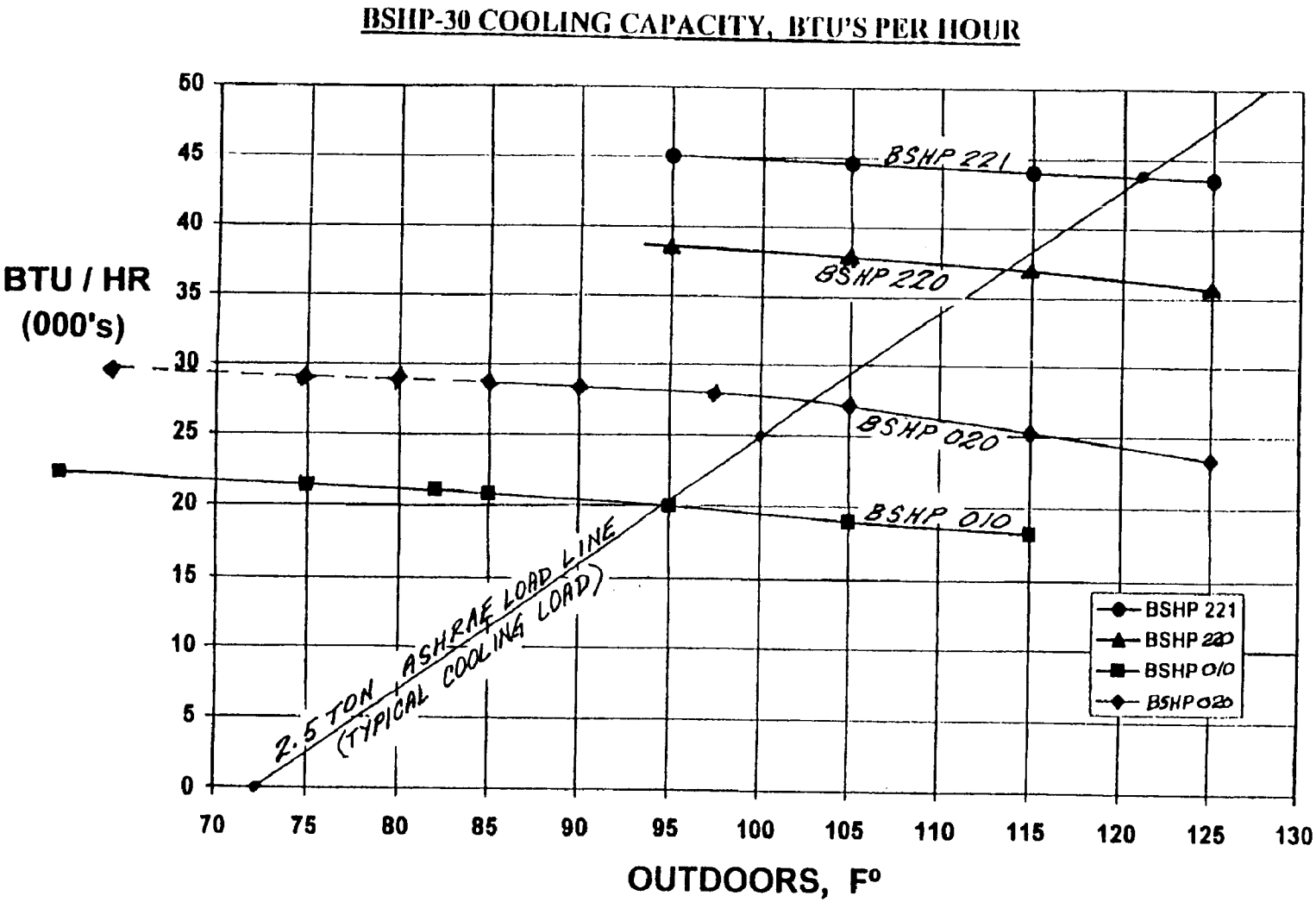
FIG. 8 is a cooling capacity chart for a typical system of the present invention.

FIG. 8 shows cooling performance for the heat pump of the present invention, and FIG. 9 shows a typical cooling operating sequence.

With outdoor ambient temperature of about 80° F., and with the first stage of thermostat 62 calling for cooling, microprocessor 62 allows operation of only one piston (40%–50% capacity) of the primary compressor 24. It is expected that this will handle most of normal cooling requirements. This is the 010 line in FIG. 8.

At about 85° F. outside ambient temperature, microprocessor 54 allows operation of only both pistons of primary compressor 24 (100% primary capacity) if called for by the thermostat. This is indicated at the 020 line in FIGS. 8 and 9.

At about 105° F. outdoor ambient, microprocessor 54 allows operation of both pistons of booster compressor 22 and both pistons of primary compressor 24. (100% capacity for both compressors). This is indicated at the 220 line of FIGS. 8 and 9. This will be effective to meet cooling needs up to about 115° F. outdoor ambient.

In addition to the foregoing, operation of both primary pistons, both booster pistons, and the economizer can be manually selected for special requirements, e.g., quick cool down, or to handle large numbers of people in a room, or high humidity conditions, etc. This is indicated at the 221 line in FIGS. 8 and 9.

It will be noted in FIGS. 6, 7, 8 and 9, that whenever operation of the booster compressor is allowed, both cylinders (100% capacity) are utilized. This means that variable capacity is not required for booster 22. Accordingly, booster 22 can be a single speed compressor (or any type). This will reduce the manufacturing cost of the system, since single speed compressors can be obtained less expensively than the Bristol or similar type TS compressor.

It will be understood that the operating modes and sequences illustrated in FIGS. 6–8 are only be way of example. Other operating modes and sequences can be employed within the scope and interest of this invention.

While this invention has been described in terms of a system for both heating and cooling, the invention can be applied for a heating system alone or a cooling system alone. In that event, the four-way valve 80 would be eliminated, and the refrigerant would always flow in one direction only.

If the booster compressor fails to operate when called for (for example because of an electrical contractor problem) the microprocessor is programmed to sense the non-operation of the booster and to proceed to a single TS mode of operation (for the primary compressor). The heating operating sequence of this single TS mode is as follows, with reference to FIG. 7:

1. From 50° F.–75° F. outdoor ambient temperature, only one cylinder of the primary compressor is allows (010 operation).
2. From 43° F.–50° F., operation of both cylinders of the primary compressor only are allowed (020 operation).
3. From any temperature below and up to 43° F., backup heat will be allowed, along with operation of both cylinders of the primary compressor. It will be noted that in this mode of operation, the 210, 211 and 221 steps of operation are eliminated, because the booster is inoperative.

In this mode of operation, where only the TS primary compressor is greater, the cooling sequence is also varied by the microprocessor.

Since the system is sized to deliver its rated cooling capacity at normal AR1 operating conditions with a 0-2-0 combination, it would just operate as a typical system of today does with the exception that 0-2-0 would not be allowed until 85° F. outdoor ambient or thereabout whereas today, it is allowed whenever the indoor thermostat would call for it. In this case as mentioned above (booster failing to operate for some reason), the second step of the cooling thermostat could call for 0-2-0 at any outdoor ambient about 65° F. or so. The first step of the cooling thermostat would still call for 0-1-0 as long as the outdoor ambient temperature is above 60° F. or so.

Accordingly, the one TS sequence of operation for cooling is as follows:

1. When the indoor thermostat calls for step 1 of cooling, operation of only one cylinder of the primary compressor will be allowed (the 010 mode) by the microprocessor as long as the sensed outdoor ambient temperature is in the range of about 60° F.–85° F.
2. When the indoor thermostat calls for second stage cooling, and the outdoor ambient temperature rises to about 85° F., operation of both stages of the TS primary compressor will occur (the 020 mode).
3. The operation of both cylinders of the primary TS compressor will be allowed on manual selection of the second step of the indoor thermostat and as long as outdoor ambient temperature is above about 60° F. (the 020 mode).

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. A compression module for a heating or air conditioning system, said module including:

a primary compressor;

a booster compressor;

at least said primary compressor being an unloadable positive displacement compressor;

a sensor for sensing the temperature of outdoor ambient air; and a controller, said controller being responsive to signals from said sensor commensurate with the temperature of outdoor ambient air to operate said primary compressor and said booster compressor in a predetermined operating sequence.

2. A compressor mode as in claim 1, wherein said predetermined operating sequence for heating includes the following:

(a) allow partial capacity operation of said primary compressor when the outdoor ambient temperature is in the range of about 50° F.–75° F.;

(b) allow full capacity operation of said primary compressor when the outdoor ambient temperature is in the range of about 43° F.–50° F.;

(c) allow full capacity operation of said booster compressor and partial capacity operation of said primary compressor when the outdoor ambient temperature is in the range of about 33° F.–43° F.;

(d) allow full capacity operation of said booster compressor, and full capacity operation of said primary compressor when the outdoor ambient temperature is in the range of about 15° F.–33° F.

3. A compressor module as in claim 1, wherein:

said primary compressor is a multiple-cylinder compressor.

4. A compressor module as in claim 1, wherein:

said booster compressor is a single speed compressor or a two speed compressor.

5. A compressor module as in claim 1, wherein:

the displacement of said booster compressor is about 30% to about 70% greater than the displacement of said primary compressor.

6. A compressor module as in claim 1, wherein:

the coefficient of performance (C.O.P.) of the system for heating is at least 1.5 for the conditions of 0° F. outdoor ambient temperature and 70° F. indoor heated space temperature.

7. A compression module as in claim 1, including:

an inlet to said primary compressor for the supply of working fluid to said primary compressor;

an inlet to said booster compressor for the supply of working fluid to said booster compressor;

a supply line from the discharge from said booster compressor to the inlet of said primary compressor; and a lubricant management system, said system having:

(a) an aspiration tube extending from the lubricant sump of said primary compressor to the intake of said primary compressor, (b) an aspiration tube extending from the lubricant sump of said booster compressor to the intake of said booster compressor, (c) a liquid trap in the supply line to the inlet to said booster compressor, and (d) a liquid trap in the supply line between the discharge from said booster compressor to the intake to said primary compressor.

8. A method of operating in sequence a heating system having a primary compressor and a booster compressor, the method including the steps of:

(a) sensing the outdoor ambient temperature;

(b) allowing partial capacity operation of said primary compressor when the outdoor ambient temperature is in the range of about 50° F.–75° F.;

(c) allowing full capacity operation of said primary compressor when the outdoor ambient temperature is in the range of about 43° F.–50° F.;

(d) allowing full capacity operation of said booster compressor and partial capacity operation of said primary compressor when the outdoor ambient temperature is in the range of about 33° F.–43° F.;

(e) allowing full capacity operation of said booster compressor, and full capacity operation of said primary compressor when the outdoor temperature is in the range of about 15° F.–33° F.

9. The method of claim 8, including the step of:

allowing operation of back-up resistance heating when the outdoor ambient temperature is about 15° F. or lower.

10. A compressor module as in claim 1, wherein said predetermined operating sequence for cooling includes the following:

(a) allow partial capacity operation of said primary compressor when the outdoor ambient temperature is in the range of about 60° F.–85° F.;

(b) allow full capacity operation of said primary compressor when the outdoor ambient temperature is in the range of above about 85° F.;

(c) allow full capacity operation of said primary compressor and full capacity operation of said booster compressor when the outdoor ambient temperature is in the range of about 105° F. or higher.

11. A compression module for a heat pump system, said module including:

a primary compressor;

a booster compressor;

at least said primary compressor being a multi-cylinder unloadable compressor;

each of said compressors having an inlet and a supply line connected to said inlet;

a sensor for sensing the temperature of outdoor ambient air;

a thermostat for sensing the temperature of a volume of air to be [healed] *heated*; and a controller, said controller being responsive to signals from said sensor commensurate with the temperature of outdoor ambient air, and to signals from said thermostat commensurate with the temperature of the air to be heated to operate said primary compressor[,] *and* said booster compressor [and said economizer] in a predetermined operating sequence.

12. A compressor module as in claim 11, wherein said predetermined operating sequence for heating includes the following:

(f) allow partial capacity operation of said primary compressor when the outdoor ambient temperature is in the range of about 50°–75° F.;

(g) allow full capacity operation of said primary compressor when the outdoor ambient temperature is in the range of about 43° F.–50° F.;

(h) allow full capacity operation of said booster compressor and partial capacity operation of said primary compressor when the outdoor ambient temperature is in the range of about 33° F.–43° F.;

(i) allow full capacity operation of said booster compressor, and full capacity operation of said primary compressor when the outdoor ambient temperature is in the range of about 15° F.–33° F.

13. A compressor module as in claim 11, wherein:

the ratio of the displacement of said booster compressor to the displacement of said primary compressor is at least about 1.3 to 1.

14. A compressor module as in claim 11, wherein:

the heating coefficient of performance (C.O.P.) of the heat pump system is at least about 1.5 for the conditions of 0° F. outdoor ambient temperature and 70° F. indoor heated space temperature.

15. A compression module as in claim 11, wherein:

100% of the capacity of said primary compressor is greater than the ordinary cooling requirements of the heat pump system.

16. A compression module for a heat pump system, said module including:

a primary compressor;

a booster compressor;

at least said primary compressor being a multi-cylinder unloadable compressor;

a sensor for sensing the temperature of outdoor ambient air;

a thermostat for sensing the temperature of a volume of air to be heated; and a controller, said controller being responsive to signals from said sensor commensurate with the temperature of outdoor ambient air, and to signals from said thermostat commensurate with the temperature of the air to be heated to operate said primary compressor and said booster compressor in a predetermined heating operating sequence including the following:

(a) allow partial capacity operation of said multi-cylinder primary compressor when the outdoor ambient temperature is in the range of about 50°–70° F.;

(b) allow full capacity operation of said multi-cylinder primary compressor when the outdoor ambient temperature is in the range of about 43° F.–50° F.;

(c) allow full capacity operation of said booster compressor and partial capacity operation of said multi-cylinder primary compressor when the outdoor ambient temperature is in the range of about 33° F.–43° F.

(d) allow full capacity operation of said booster compressor, and full capacity operation of said multi-cylinder primary compressor when the outdoor ambient temperature is in the range of about 15° F.–30° F.;

(e) allow operation of back-up resistance heating when the outdoor ambient temperature is about 15° F. or lower.

17. A compressor module as in claim 16, wherein:

the ratio of the displacement of said booster compressor to the displacement of said primary compressor is at least about 1.3 to 1.

18. A compressor module as in claim 16, wherein:

the heating coefficient of performance (C.O.P.) Of the heat pump system is at least about 1.5 for the conditions of 0° F. outdoor ambient temperature and 70° F. indoor heated space temperature.

19. A compression module as in claim 16, wherein:

100% of the capacity of said primary compressor is greater than the ordinary cooling requirements of the heat pump system.

20. A compressor module as in claim 1, wherein:

said booster compressor is a single speed compressor.

21. A compressor module as in claim 16, wherein:

said controller is responsive to signals from said sensor commensurate with the temperature of outdoor ambient air, and to signals from said thermostat commensurate with the temperature of the air to be cooled to operate said primary compressor, and said booster compressor in a predetermined cooling operating sequence, including the following:

(a) allow partial capacity operation of said primary compressor when the outdoor ambient temperature is in the range of about 60° F.–85° F.;

(b) allow full capacity operation of said primary compressor when the outdoor ambient temperature is in the range of above about 85° F.;

(c) allow full capacity operation of said primary compressor and full capacity operation of said booster compressor when the outdoor ambient temperature is in the range of about 105° F. or higher.

22. A method of operating in heating sequence a heat pump system having a multi-cylinder unloadable primary compressor and a booster compressor, the method including the steps of:

(a) sensing the outdoor ambient temperature;

(b) allowing partial capacity operation of said multi-cylinder primary compressor when the outdoor ambient temperature is in the range of about 50°–75° F.;

(c) allowing full capacity operation of said multi-capacity primary compressor when the outdoor ambient temperature is in the range of about 43° F.–50° F.;

(d) allowing full capacity operation of said booster compressor and partial capacity operation of said multi-cylinder primary compressor when the outdoor ambient temperature is in the range of about 33° F.–43° F.;

(e) allowing full capacity operation of said booster compressor, and full capacity operation of said multi-cylinder primary compressor, when the outdoor ambient temperature is in the range of about 15° F.–33° F.;

(f) allowing operation of back-up resistance heating when the outdoor ambient temperature is about 15° F. or lower.

23. A method of operating in cooling sequence a heat pump system having a multi-cylinder unloadable primary compressor, and a booster compressor, that method including the steps of:

(a) sensing the outdoor ambient temperature;

(b) allowing partial capacity operation of said primary compressor when the outdoor ambient temperature is in the range of about 60° F.–85° F.;

(c) allowing full capacity operation of said primary compressor when the outdoor ambient temperature is in the range of above about 85° F.;

(d) allowing full capacity operation of said primary compressor and full capacity operation of said booster compressor when the outdoor ambient temperature is in the range of about 105° F. or higher.

24. A compression module for a heat pump system, said module including:

a primary compressor;

a booster compressor;

at least said primary compressor being a multi-cylinder unloadable compressor;

each of said compressors having an inlet and a supply line connected to said inlet;

a supply line from the discharge from said booster compressor to the inlet of said primary compressor;

an economizer;

a sensor for sensing the temperature of outdoor ambient air;

a thermostat for sensing the temperature of a volume of air to be heated; and a controller, said controller being responsive to signals from said sensor commensurate with the temperature of outdoor ambient air, and to signals from said thermostat commensurate with the temperature of the air to be heated to operate said primary compressor, said booster compressor and said economizer in the following heating sequence:

(a) allowing partial capacity operation of said multi-cylinder primary compressor when the outdoor ambient temperature is in the range of about 50°–75° F.;

(b) allow full capacity operation of said multi-cylinder primary compressor when the outdoor ambient temperature is in the range of about 43°F.–50° F.;

(c) allow full capacity operation of said booster compressor and partial capacity operation of said multi-cylinder primary compressor when the outdoor ambient temperature is in the range of about 33° F.–43° F.;

(d) allow full capacity operation of said booster compressor, and partial capacity operation of said multi-cylinder primary compressor, and said economizer when the outdoor ambient temperature is in the range of about 25° F.–33° F.;

(e) allow full capacity operation of said booster compressor, and full capacity operation of said multi-cylinder primary compressor, and said economizer when the outdoor ambient temperature is in the range of about 15° F.–25° F.;

(f) allow operation of back-up resistance heating when the outdoor ambient temperature is about 15° F. or lower.

25. A compression module for a heat pump system, said module including:

a primary compressor;

a booster compressor;

at least said primary compressor being a multi-cylinder unloadable compressor;

each of said compressors having an inlet and a supply line connected to said inlet;

a supply line from the discharge from said booster compressor to the inlet to said primary compressor;

an economizer;

a sensor for sensing the temperature of outdoor ambient air;

a thermostat for sensing the temperature of a volume of air to be cooled; and a controller, said controller being responsive to signals from said sensor commensurate with the temperature of outdoor ambient air, and to signals from said thermostat commensurate with the temperature of the air to be heated to operate said primary compressor, said booster compressor and said economizer in the following cooling sequence:

(a) allow partial capacity operation of said multi-cylinder primary compressor when the outdoor ambient temperature is in the range of about 60° F.–85° F.;

(b) allow full capacity operation of said multi-cylinder primary compressor when the outdoor ambient temperature is in the range of above about 85° F.;

(c) allow full capacity operation of said multi-cylinder primary compressors and full capacity operation of said booster compressor when outdoor ambient temperature is in the range of about 105° F.

26. The compression module of claim 25, including:

allow operation of said economizer and full capacity operation of said primary compressor and full capacity operation of said booster compressor.

27. A compressor module as in claim 24, including:

a lubricant management system, said system having:

(a) an aspiration tube extending from the lubricant sump of said primary compressor to the intake of said primary compressor, (b) an aspiration tube extending from the lubricant sump of said booster compressor to the intake of said booster compressor, (c) a liquid trap in the supply line to the inlet to said booster compressor, and (d) a liquid trap in the supply line between the discharge from said booster compressor to the intake to said primary compressor.

28. A compressor module as in claim 24, wherein:

the displacement of said booster compressor is about 10%–about 50% greater than the displacement of said primary compressor.

29. A compressor module as in claim 24, wherein:

the ratio of the displacement of said booster compressor to the displacement of said primary compressor is at least about 1.3 to 1.

30. A compressor module as in claim 24, wherein:

the coefficient of performance (C.O.P.) Of the heat pump system is at least about 2 for the conditions of 0° F. outdoor ambient temperature and 70° F. indoor heated space temperature.

31. A compression module as in claim 24, wherein:

100% of the capacity of said primary compressor is greater than the ordinary cooling requirements of the heat pump system.

32. A compressor module as in claim 24, wherein:

said booster compressor is a single speed compressor.

33. A compressor module as in claim 24, wherein:

each of said booster compressor and said primary compressor is a twin-single compressor.

34. A method of operating in heating sequence a heat pump system having a primary multi-cylinder unloadable compressor, a booster compressor and an economizer, the method including the steps of:

(a) sensing the outdoor ambient temperature;

(b) allowing partial capacity operation of said multi-cylinder primary compressor when the outdoor ambient temperature is in the range of about 50°–75° F.;

(c) allowing full capacity operation of aid multi-cylinder primary compressor when the outdoor ambient temperature is in the range of about 43° F.–50° F.;

(d) allowing full capacity operation of said booster compressor and partial capacity operation of said multi-cylinder primary compressor when the outdoor ambient temperature is in the range of about 33° F.–43° F.;

(e) allowing full capacity operation of said booster compressor, and partial capacity operation of said multi-cylinder primary compressor, and said economizer when the outdoor ambient temperature is in the range of about 25° F.–33° F.;

(f) allowing full capacity operation of said booster compressor, and full capacity operation of said multi-cylinder compressor, and said economizer when the outdoor ambient temperature is in the range of about 15° F.–25° F.;

(g) allowing operation of back-up resistance heating when the outdoor ambient temperature is about 15° F. or lower.

35. A method of operating in cooling sequence a heat pump system having a multi-cylinder unloadable primary compressor, a booster compressor and an economizer, the method including the steps of:

(a) sensing the outdoor ambient temperature;

(b) allowing partial capacity operation of said multi-cylinder primary compressor when the outdoor ambient temperature is in the range of about 60° F.–85° F.;

(c) allowing full capacity operation of said multi-cylinder primary compressor when the outdoor ambient temperature is in the range of above about 85° F.; and (d) allowing full capacity operation of said multi-cylinder primary compressor and full capacity operation of said booster compressor when the outdoor ambient temperature is in the range of about 105° F.

36. The method as in claim 35, including the step of:

operating said economizer along with full capacity operation of said multi-cylinder primary compressor and full capacity operation of said booster compressor.

*37. A compressor system for a heating or air conditioning system including:*

*a primary compressor;*

*a booster compressor;*

*at least said primary compressor being a multi-capacity compressor;*

*a sensor for sensing the temperature of outdoor ambient air or a parameter commensurate with the temperature of outdoor ambient air; and*

*a controller, said controller being responsive to signals from said sensor commensurate with the temperature of outdoor ambient air to operate said primary compressor and said booster compressor in a predetermined operating sequence.*

*38. A compressor system as in claim 37, wherein said predetermined operating sequence for heating includes the following:*

*(a) allow partial capacity operation of said primary compressor when the outdoor ambient temperature is in the range of about 50° F.–75° F.;*

*(b) allow full capacity operation of said primary compressor when the outdoor ambient temperature is in the range of about 43° F.–50° F.;*

*(c) allow full capacity operation of said booster compressor and partial capacity operation of said primary compressor when the outdoor ambient temperature in the range of about 33° F.–43° F.;*

*(d) allow full capacity operation of said booster compressor and full capacity of said primary compressor when the outdoor ambient temperature is in the range of about 15° F.–33° F.*

*39. A compressor system as in claim 37 wherein:*

*said primary compressor is a multiple-cylinder compressor.*

*40. A compressor system as in claim 37 wherein*

*said booster compressor is a single speed compressor or a two-speed compressor.*

*41. A compressor system as in claim 37, wherein:*

*the displacement of said booster compressor is about 30% to about 70% greater than the displacement of said primary compressor.*

*42. A compressor system as in claim 37, wherein:*

*the coefficient of performance (C.O.P.) of the system for heating is at least 1.5 for the conditions of 0° F. outdoor ambient temperature and 70° F. indoor heated space temperature.*

*43. A compressor system as in claim 37 including:*

*an inlet to said primary compressor for the supply of working fluid to said primary compressor;*

*a supply line from the discharge from said booster compressor to the inlet to said primary compressor; and*

*a lubricant management system, said system having:*

*(a) an aspiration tube extending from the lubricant sump of said primary compressor to the intake of said primary compressor;*

*(b) an aspiration tube extending from the lubricant sump of said booster compressor to the intake of said booster compressor;*

*(c) a liquid trap in the supply line between the discharge from said booster compressor to the intake to said primary compressor.*

*44. A compressor system as in claim 37 wherein said predetermined operating sequence for cooling includes the following:*

*(a) allow partial capacity operation of said primary compressor when the outdoor ambient temperature is in the range of about 60° F.–85° F.;*

*(b) allow full capacity operation of said primary compressor when the outdoor ambient temperature is in the range of above about 85° F.;*

*(c) allow full capacity operation of said primary compressor and full capacity operation of said booster compressor when the outdoor ambient temperature is in the range of about 105° F. or higher.*

*45. A heat pump system, said system including:*

*a primary compressor;*

*a booster compressor;*

*at least said primary compressor being a multi-capacity compressor;*

*each of said compressors having an inlet and a supply line connected to said inlet;*

*a sensor for sensing the temperature of outdoor ambient air or a parameter commensurate with the temperature of outdoor ambient air;*

*a thermostat for sensing the temperature of a volume of air to be heated; and*

*a controller, said controller being responsive to signals from said sensor commensurate with the temperature of outdoor ambient air, and to signals from said thermostat commensurate with the temperature of the air to be heated to operate said primary compressor, said booster compressor in a predetermined operating sequence.*

*46. A compressor system as in claim 45 wherein:*

*the ratio of the displacement of said booster compressor to the displacement of said primary compressor is at least about 1.3 to 1.*

*47. A compressor system as in claim 45 wherein:*

*the heating coefficient of performance (C.O.P.) of the heat pump system is at least about 1.5 for the conditions of 0° F. outdoor ambient temperature and 70° F. indoor heated space temperature.*

*48. A compressor system as in claim 45 wherein:*

*100% of the capacity of said primary compressor is greater than the ordinary cooling requirement of the heat pump system.*

*49. A compressor system as in claim 37, wherein:*

*said booster compressor is a single speed compressor.*

*50. A method of operating in cooling sequence a heat pump system having a multi-capacity primary compressor, and a booster compressor, that method including the steps of:*

*(a) sensing the temperature of outdoor ambient air or a parameter commensurate with the outdoor ambient temperature;*

*(b) allowing partial capacity operation of said primary compressor when the outdoor ambient temperature is in the range of about 60° F.–85° F.;*

*(c) allowing full capacity operation of said primary compressor when the outdoor ambient air temperature is in the range of above about 85° F.;*

*(d) allowing full capacity operation of said primary compressor and full capacity operation of said booster compressor when the outdoor ambient air temperature is in the range of about 105° F. or higher.*

*51. A compressor system for a heat pump system, said system including:*

*a primary compressor;*

*a booster compressor;*

*at least said primary compressor being a multi-capacity compressor;*

*each of said compressors having an inlet and a supply line connected to said inlet;*

*a supply line from the discharge from said booster compressor to the inlet to said primary compressor;*

*a sensor for sensing the temperature of outdoor ambient air or a parameter commensurate with the temperature of outdoor ambient air; and*

*a thermostat for sensing the temperature of a volume of air to be cooled; and*

*a controller, said controller being responsive to signals from said sensor commensurate with the temperature of outdoor ambient air, and to signals from said thermostat commensurate with the temperature of the air to be heated to operate said primary compressor, and said booster compressor in the following cooling sequence;*

*(a) allow partial capacity operation of said multi-capacity primary compressor when the outdoor ambient temperature is in the range of about 60° F.–85° F.;*

*(b) allow full capacity operation of said multi-capacity primary compressor when the outdoor ambient temperature is in the range of above about 85° F.;*

*(c) allow full capacity operation of said multi-capacity primary compressors and full capacity operation of said booster compressor when outdoor ambient temperature is in the range of about 105° F.*

*52. The compressor system of claim 51 including:*

*allow operation of said economizer and full capacity operation of said primary compressor and full capacity operation of said booster compressor.*

*53. A method of operating in cooling sequence a heat pump system having a multi-capacity primary compressor, a booster compressor and an economizer, the method including the steps of:*

*(a) sensing the temperature of outdoor ambient air or a parameter commensurate with the outdoor ambient temperature;*

*(b) allowing partial capacity operation of said primary compressor when the outdoor ambient temperature is in the range of about 60° F.–85° F.;*

*(c) allowing fully capacity operation of said multi-cylinder primary compressor when the outdoor ambient temperature is in the range of above about 85° F.; and*

*(d) allowing full capacity operation of said multi-cylinder primary compressor and fully capacity operation of said booster compressor when the outdoor ambient temperatures is in the range of 105° F.*

*54. The method as in claim 53 including the step of:*

*operating an economizer along with full capacity operation of said multi-capacity primary compressor and full capacity operation of said booster compressor.*

* * * * *